(12) United States Patent
Hatzinikolas

(10) Patent No.: US 6,973,756 B2
(45) Date of Patent: Dec. 13, 2005

(54) CONNECTOR AND SYSTEM FOR SUPPORTING VENEER PANELS

(76) Inventor: Michael Hatzinikolas, 15305-117 Avenue, Edmonton (CA), T5M 3X4

( * ) Notice: Subject to any disclaimer, the term of this patent is extended or adjusted under 35 U.S.C. 154(b) by 3 days.

(21) Appl. No.: 10/430,298

(22) Filed: May 7, 2003

(65) Prior Publication Data

US 2004/0221535 A1 Nov. 11, 2004

(51) Int. Cl.$^7$ ................................................. E04B 1/38
(52) U.S. Cl. ........................ 52/235; 52/477; 52/506.05; 52/506.06
(58) Field of Search ....................... 52/235, 477, 483.1, 52/489.1, 506.05, 512, 506.06; 248/250, 235

(56) References Cited

U.S. PATENT DOCUMENTS

| | | | | | |
|---|---|---|---|---|---|
| 750,595 | A | * | 1/1904 | Campbell | 248/250 |
| 1,324,537 | A | * | 12/1919 | Belcher | 108/108 |
| 1,818,299 | A | * | 8/1931 | Bowman | 52/335 |
| 2,860,504 | A | * | 11/1958 | Sinner et al. | 52/378 |
| 3,319,983 | A | * | 5/1967 | Zibell | 403/400 |
| 3,342,005 | A | * | 9/1967 | Rickards et al. | 52/702 |
| 3,350,830 | A | * | 11/1967 | Smith, Jr. et al. | 52/509 |
| 3,842,554 | A | * | 10/1974 | Swick | 52/235 |
| 3,984,077 | A | * | 10/1976 | Shine | 248/248 |
| 4,076,203 | A | * | 2/1978 | McDonnell | 248/247 |
| 4,107,887 | A | * | 8/1978 | Wendt | 52/105 |
| 4,429,850 | A | * | 2/1984 | Weber et al. | 248/250 |
| 4,631,888 | A | * | 12/1986 | Palmans | 52/509 |
| 4,799,643 | A | * | 1/1989 | Shepard | 248/544 |
| 5,265,396 | A | * | 11/1993 | Amimoto | 52/745.12 |
| 5,283,992 | A | * | 2/1994 | Morassutti | 52/509 |
| 5,860,257 | A | * | 1/1999 | Gerhaher et al. | 52/235 |
| 6,055,787 | A | * | 5/2000 | Gerhaher et al. | 52/546 |
| 6,484,465 | B2 | * | 11/2002 | Higgins | 52/474 |
| 6,503,558 | B2 | * | 1/2003 | Williamson | 427/180 |
| 6,574,936 | B1 | * | 6/2003 | Anderson, Sr. | 52/506.06 |
| 6,598,362 | B2 | * | 7/2003 | Hikai | 52/235 |
| 6,792,727 | B2 | * | 9/2004 | Krieger | 52/245 |
| 2003/0150179 | A1 | * | 8/2003 | Moreno | 52/235 |

FOREIGN PATENT DOCUMENTS

| | | | | |
|---|---|---|---|---|
| EP | 120788 A1 | * | 10/1984 | E04F/13/08 |
| EP | 479733 A1 | * | 4/1992 | E04F/13/08 |
| JP | 05065759 A | * | 3/1993 | E04F/13/14 |
| JP | 05065760 A | * | 3/1993 | E04F/13/14 |
| WO | WO 9409222 A1 | * | 4/1994 | E04B/9/28 |

* cited by examiner

*Primary Examiner*—Peter M. Cuomo
*Assistant Examiner*—Stephen D'Adamo
(74) *Attorney, Agent, or Firm*—Bereskin & Parr

(57) ABSTRACT

A connector is provided for coupling a veneer panel to a back-up wall. The connector includes a veneer connector and a support member. The veneer connector is adapted to support a generally horizontal edge of the veneer panel. The support member includes a mounting flange that is adapted for securing the support member to the back-up wall. The support member further includes at least one support member side wall for supporting the veneer connector. The at least one support member side wall extends from the mounting flange and is generally vertical. A system of such connectors may be used for the mounting of one or more veneer panels on a back-up wall.

17 Claims, 17 Drawing Sheets

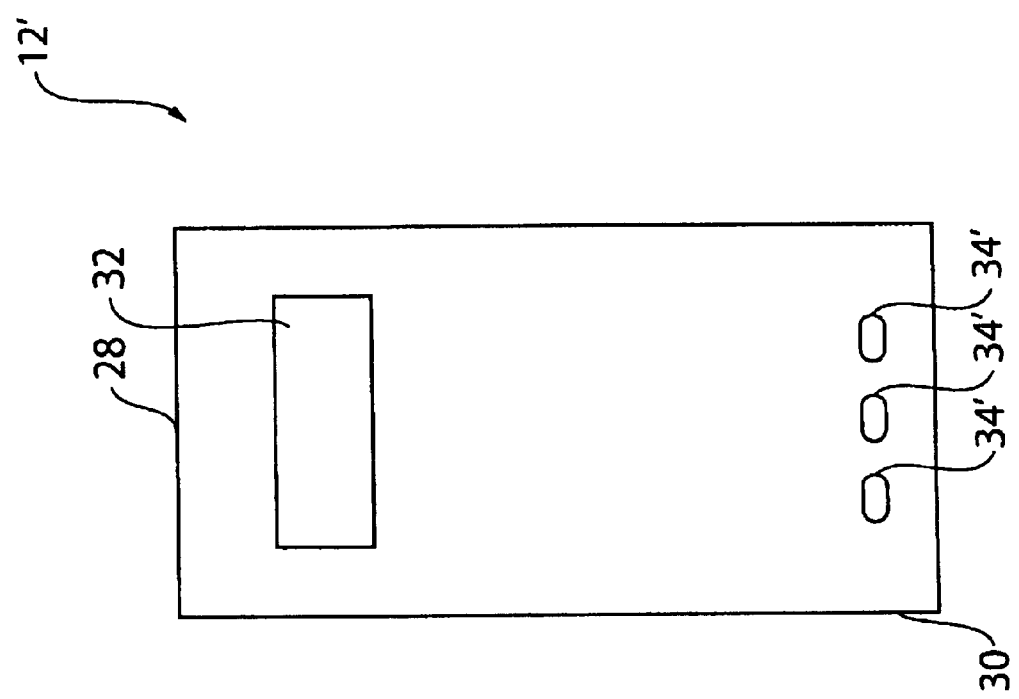

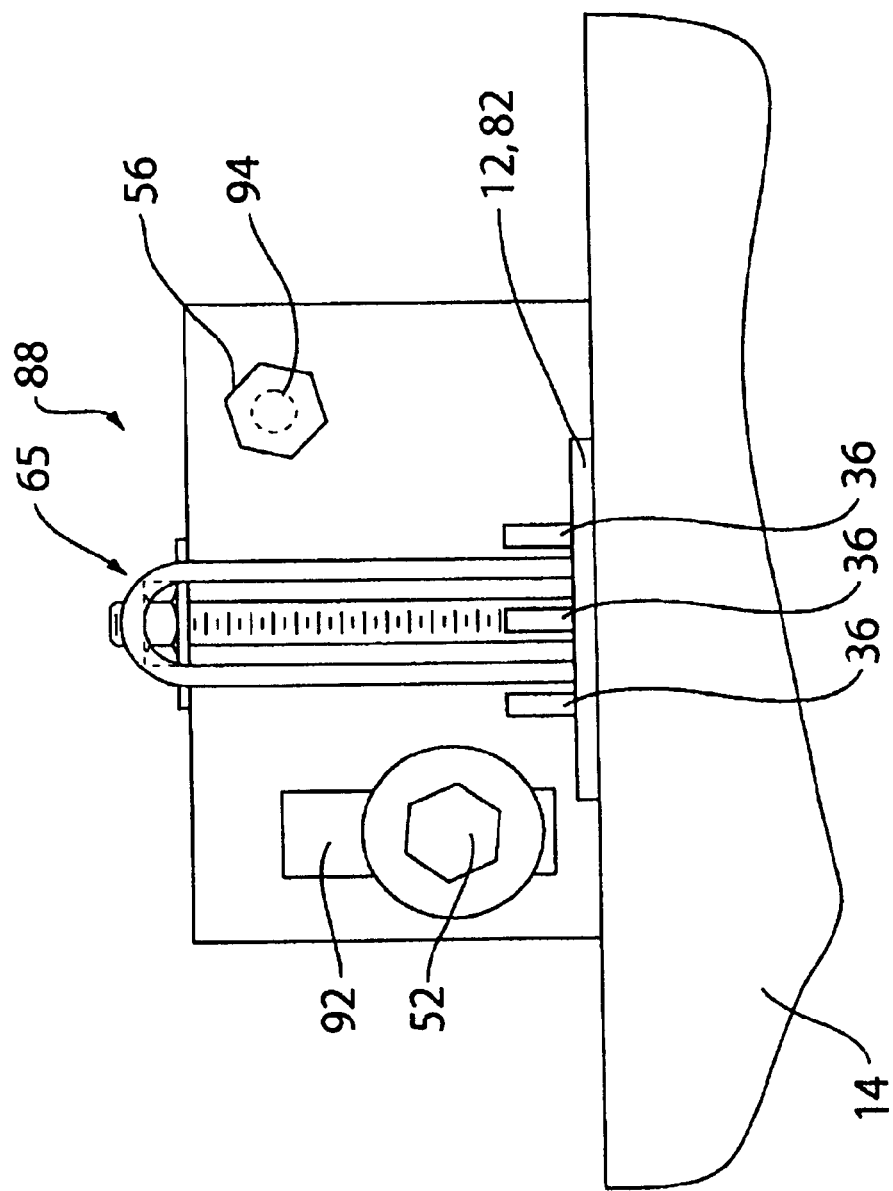

US 6,973,756 B2

CONNECTOR AND SYSTEM FOR SUPPORTING VENEER PANELS

FIELD OF THE INVENTION

This invention relates to a connector for securing veneer to back-up walls.

BACKGROUND OF THE INVENTION

Many construction techniques have been developed for commercial buildings utilizing a back-up wall and a set of thin walled veneer panels that are supported on the back-up wall. Typically, there is a cavity between the veneer panels and the back-up wall to allow for the insertion of insulation and other materials. The veneer panels are connected to the back up wall using any of several different styles of connectors that are currently available. In addition to supporting the veneer panels, these connectors typically withstand various other loads, such as shear and wind loads.

Typically prior art connectors are relatively expensive to manufacture, and offer relatively poor load-bearing capacity for their weight and cost. One such prior art connector consists of an L-shaped member, and a veneer connector plate. The vertical portion of the L-shaped member is mounted to the back-up wall, and the horizontal portion extends outwardly therefrom. The horizontal portion typically includes slotted holes therethrough, for the mounting of the veneer connector plate thereon. The veneer connector plate extends outwards and supports at its outwardmost edge, a portion of a veneer panel.

For several reasons, these connectors are typically relatively expensive, and can add to the overall cost of erecting a building. One reason for their cost is that, to support the required loads during use, such connectors are typically required to be made from relatively thick materials. For example, for some applications, the L-shaped member is made from angle having a ⅜" wall thickness. Furthermore, many building codes require such connectors to be made from stainless steel, to resist corrosion and subsequent weakening or failure. Because of this materials requirement, the cost of the L-shaped member is increased substantially.

Furthermore, in order to cut ⅜" thick angle when making the L-shaped member, a sophisticated cutting device may be required, such as, for example, a plasma cutter. Plasma cutters are typically more expensive to operate than other cutting devices, and also, plasma cutter operators are more expensive than other cutting machine operators due to their relatively uncommon expertise.

A further issue driving the cost of prior art connectors is that, typically, they include at least two stainless steel bolts in their assembly, for example, to attach the veneer connector to the L-shaped piece. Stainless steel bolts are relatively expensive and can add significantly to the overall cost of the connector.

Accordingly, there is a need for a connector that is relatively inexpensive to manufacture, for use in supporting veneer panels.

SUMMARY OF THE INVENTION

In a first aspect, the invention is directed to a connector for coupling a veneer panel to a back-up wall. The connector includes a veneer connector and a support member. The veneer connector is adapted to support a generally horizontal edge of the veneer panel. The support member includes a mounting flange that is adapted for securing the support member to the back-up wall. The support member further includes at least one support member side wall for supporting the veneer connector. The at least one support member side wall extends from the mounting flange and is generally vertical.

In a second aspect, the invention is directed to a system for the mounting of one or more veneer panels on a back-up wall. The system incorporates a plurality of the connectors described above. The connectors cooperate with each other to capture the veneer panels from above and below.

BRIEF DESCRIPTION OF THE DRAWINGS

For a better understanding of the present invention and to show clearly how it may be carried into effect, reference will now be made, by way of example, to the accompanying drawings, in which:

FIG. 2a is a plan view of a variant of the veneer connector shown in FIG. 2;

FIG. 8a is an end view the support member variant shown in FIG. 8, supporting a veneer panel;

DETAILED DESCRIPTION OF THE INVENTION

Figure 1:
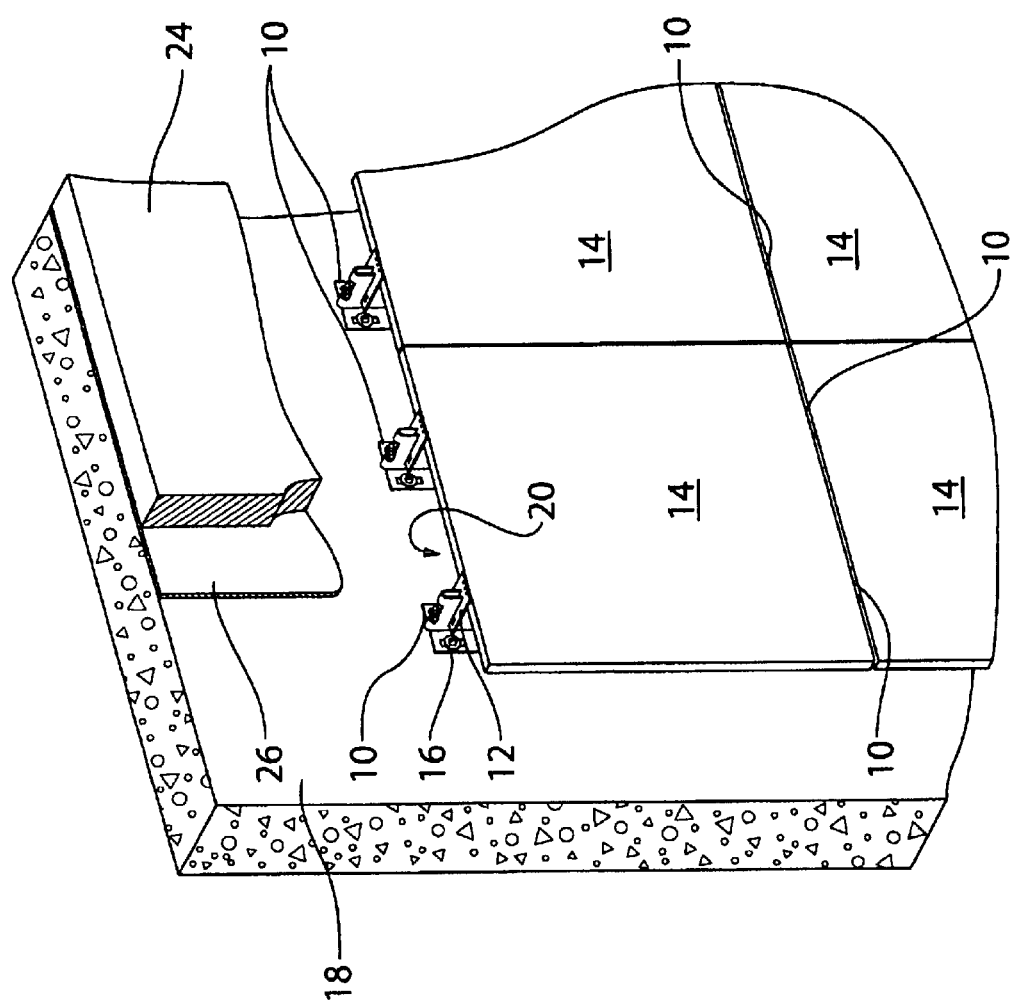
FIG. 1 is a perspective view of a system of connectors in accordance with a first embodiment of the present invention, supporting panels of veneer on a back up wall.

Reference is made to FIG. 1, which shows a system of connectors 10 in accordance with a preferred embodiment of the present invention. The connector 10 includes a veneer connector 12 for connecting with a veneer panel 14, and a support member 16 adapted for receiving the veneer connector 12 and for securement to a back-up wall 18. The connector 10 may be made of any suitable material, such as 10 or 11 gauge stainless steel. The connector 10 is preferably free of welds and formed from a single sheet of metal manufactured into the desired shape. The veneer panel 14 is may be a natural stone material, such as marble or granite. The veneer panel 14 may be a thin-walled panel, which is typically known as a thin masonry veneer panel, which many building codes require to be individually supported (ie. each panel must be supported individually). It will be noted that the mortar that would typically exist between adjacent veneer panels 14 has been removed from the Figures for greater clarity.

The back-up wall 18 may be of form-poured concrete construction. Alternatively, the back-up wall 18 may be constructed of any suitable material, such as, for example, metallic studs, or block masonry. The veneer panels 14 may be spaced from the back-up wall 18 to provide a cavity 20 therebetween. Optionally, an insulation material 24 and a vapour barrier 26 may be installed in the cavity 20.

Figure 2:
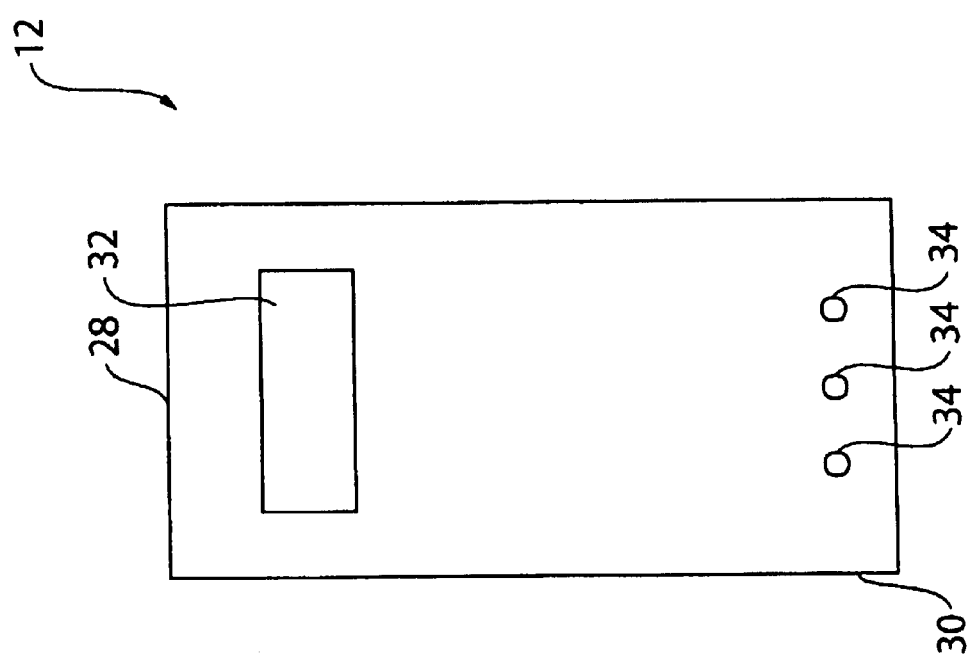
FIG. 2 is a magnified plan view of a veneer connector shown in FIG. 1.
Figure 5:
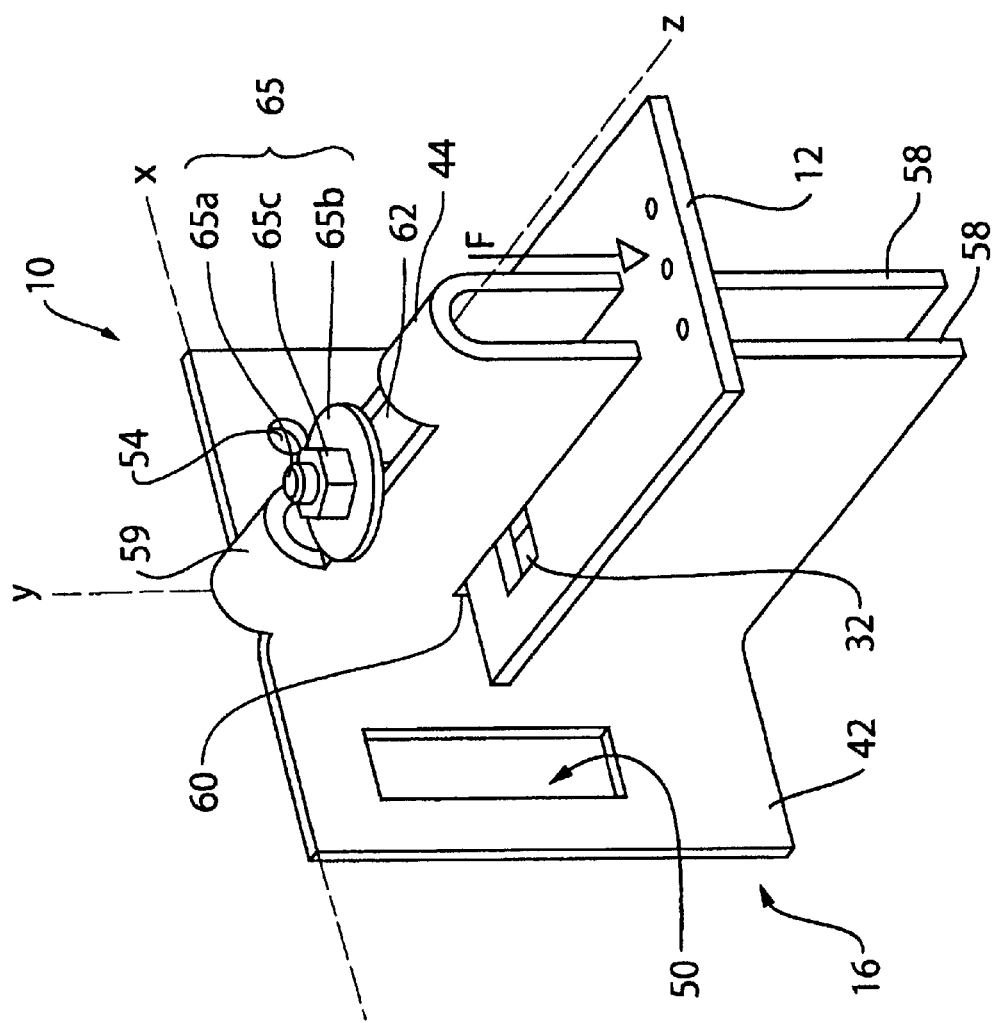
FIG. 5 is a magnified perspective view of the connector shown in FIG. 1.

Reference is made to FIG. 2, which shows the veneer connector 12 in plan view. The veneer connector 12 may have a generally rectangular shape and has a first edge 28 and a second edge 30. An adjustment aperture 32 may be positioned adjacent the first edge 28. Referring to FIG. 5, the adjustment aperture 32 is used to receive a fastener 65 to join the veneer connector 12 to the support member 16. Referring to FIG. 2, the adjustment aperture 32 may be generally elongate to permit adjustment of the position of the veneer connector 12 within the support member 16, as will be discussed further below.

Figure 3:
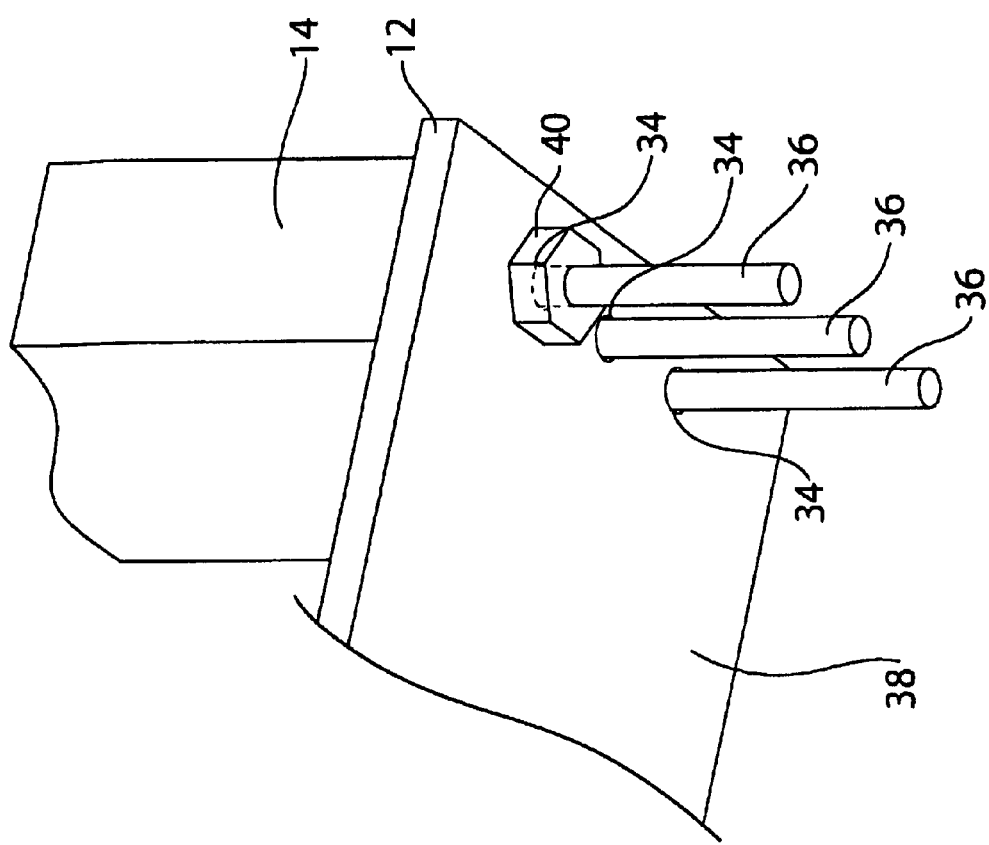
FIG. 3 is a perspective view of a portion of the veneer connector shown in FIG. 2, supporting a panel of veneer.

The veneer connector 12 includes a plurality of veneer connection apertures 34, which may be positioned proximate the second edge 30. The veneer connector 12 may include any suitable number of veneer connection apertures 34, such as, for example, three apertures 34, as shown in FIG. 2. Referring to FIG. 3, the veneer connection apertures 34 permit the pass-through of fastening ties 36 that extend from the edge of the veneer panel 14. The veneer connection apertures 34 may be generally circular, and may be sized to permit easy pass-through of the fastening ties 36, but are not required to be so large as to facilitate substantial adjustment of the veneer 14 relative to the veneer connector 12.

The veneer connection apertures 34 are positioned proximate the second edge 30 of the veneer connector 12 to prevent the unwanted protrusion of the second edge 30 past the outer face of the veneer 14. Thus, the second edge 30 can be buried in the mortar between vertically adjacent panels of veneer 14.

Referring to FIG. 2a, an alternative veneer connector 12' is shown, which has a plurality of veneer connection apertures 34' which are elongate to provide further adjustability of the veneer connector 12 with respect to the fastening ties 36.

Referring to FIG. 3, a securing means 40 prevents veneer 14 from disengaging from veneer connector 12. Securing means 40 may be any suitable means, such as, for example, a mechanical fastener or a weld.

The veneer connector 12 supports the veneer panel 14 (FIG. 1) during use generally in the region of the veneer connection apertures 34. The load imparted to the veneer connector 12 from the weight of the veneer panel 14 is shown at F.

Figure 4:
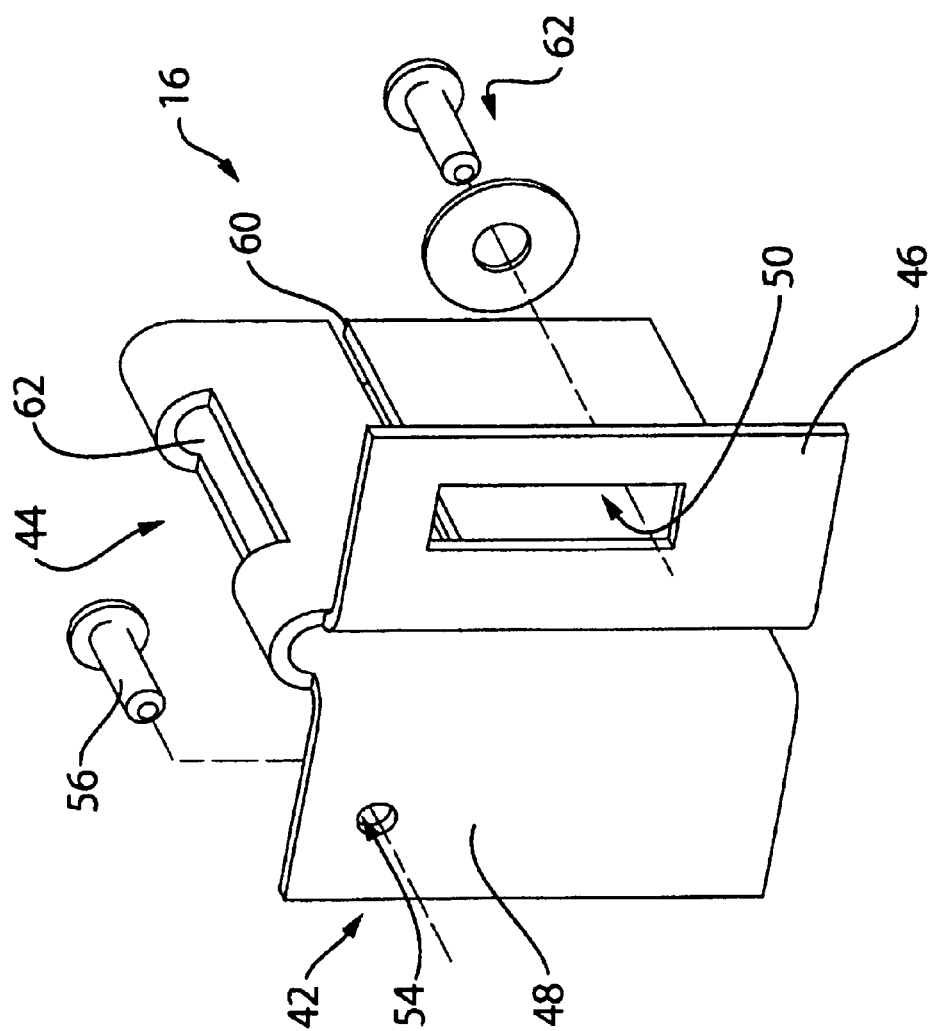
FIG. 4 is a magnified perspective view of a support member shown in FIG. 1.

Reference is made to FIG. 4, which shows the support member 16 in more detail. The support member 16 includes a mounting flange 42 and a support portion 44. The mounting flange 42 is adapted for mounting the support member 16 to the back-up wall 18 (FIG. 1).

The mounting flange 42 has an adjustment aperture 50 therethrough, which is adapted to receive a fastener 52, for fastening the support member 16 to the back-up wall 18 (FIG. 1). The adjustment aperture 50 may be generally elongate, as shown in FIG. 4, to permit adjustment of the support member 16 in the vertical direction. Such vertical adjustment capability facilitates aligning the support members 16 in a row on the back-up wall 18 (FIG. 1).

The mounting flange 42 also includes a securing aperture 54 therethrough, may be positioned on the other side of the mounting flange 48, generally opposite the adjustment aperture 50. The securing aperture 54 is adapted for receiving a fastener 56 therethrough to further retain the support member 16 on the back-up wall 18 (FIG. 1), and to fix the position of the support member 16 therewith. Once the desired adjustment to the position of the support member 16 has been made using the fastener 52 and the adjustment aperture 50, the fastener 56 may be passed through the aperture 54 and into the back up wall 18 (FIG. 1), to fix the position of the support member 16.

Reference is made to FIG. 5, which shows the support portion 44 of the support member 16 more clearly. The support portion 44 extends from the mounting flange 42 in a generally vertical plane denoted by the axes (y) and (z), and joins the mounting flange 42 along two generally vertical lines which extend in the vertical (y) direction. By extending in a generally vertical plane, the support portion 44 is provided with a generally greater resistance to vertical bending forces, which result from the load F, that arise when the connector 10 supports a veneer panel 14 (FIG. 1). In other words, the configuration of the support portion 44 provides the support member 16 with a relatively high moment of inertia in the vertical (y) direction, compared to a typical L-shaped member used in connectors of the prior art.

The support portion 44 is made up of two spaced apart side walls 58, which are connected at their respective upper ends by a top portion 59. The top portion 59 and the spaced configuration of the side walls 58 provide resistance to bending loads that can occur in the lateral (x) direction during use. It is expected that any lateral loads will be smaller than the vertical loads incurred from the weight of the veneer 14 (FIG. 1). As a result, the moment of inertia in the lateral (x) direction may be smaller than that in the vertical (y) direction.

The side members 58 together define a slot portion 60, which may extend in a generally horizontal (x-z) plane, for receiving and supporting the veneer connector 12. The slot 60 permits the lateral adjustment of the veneer connector 12 in both the (x) direction and in the z direction. The slot 60 is made sufficiently deep so that the veneer connector 12 is supported along a substantial portion of its length. More particularly, the support portion 44 extends outwards to support the veneer connector 12 proximate its load supporting region, ie. the region about the apertures 34 where the load F is imparted to the veneer connector 12 by the veneer panel 14 (FIG. 1). This reduces bending stresses on the veneer connector 12 in use when supporting a veneer panel 14 (FIG. 1).

The slot 60 is preferably positioned proximate the upper ends of the side walls 58, to reduce its impact on the overall moment of inertia of the support portion 44 in the vertical (y) direction. It will be noted that the slot 60 may extend in a plane that is other than horizontal. For example the slot 60 may be angled generally downwards towards its blind end, so that the veneer connector 12 may be retained in place temporarily without the use of a fastener.

An adjustment aperture 62 may be defined in the upper portion 59, for receiving the fastener 65 therethrough. The fastener 65 may pass through the adjustment aperture 62 and the adjustment aperture 32 in the veneer connector 12 for fixedly retaining the veneer connector 12 in place in the support member 16. The adjustment aperture 62 may be generally elongate, and may extend in a direction that is generally perpendicular the aperture 32 in the veneer connector 12. In this way, the apertures 62 and 32 cooperate to provide adjustment for the veneer connector 12 within the slot 60 in both the (x) and (z) directions.

The fastener 65 may be any suitable type of fastener. For example, the fastener 65 may be made up of a stainless steel hex-head bolt 65a, a washer 65b, and a nut 65c. The hex head bolt 65a extends upwards from under the veneer connector 12, and is sized so that the side walls 58 capture the head of the bolt 65a and prevent it from rotating. The threaded end of the bolt 65a passes up and through the adjustment aperture 62 on the support member 16. The washer 65b and nut 65c are positioned on the exposed end of the bolt 65a and are tightened to provide a secure connection between the support member 16 and the veneer connector 12. By having captured the bolt 65a between the side walls 58, the task of installing the fastener 65 is facilitated. It will be noted that other types of bolts and other types of fasteners altogether could alternatively be used to connect the support member 16 and the veneer connector 12.

Figure 5A:
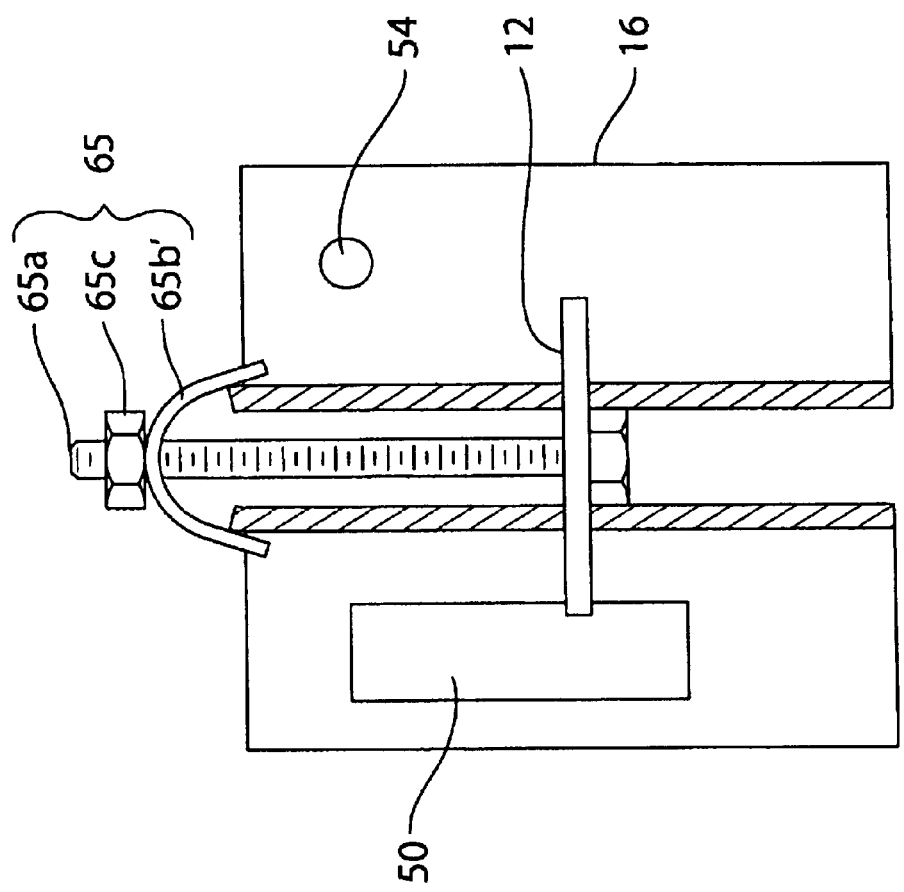
FIG. 5a is an end view of the connector shown in FIG. 5, partially sectioned for greater clarity, with a variant to the fastener shown in FIG. 5.

Reference is made to FIG. 5a, which shows an alternative washer 65b' that can be used as part of the connector 65. The washer 65b' may have a generally arcuate shape in side view and extends downwards to capture the side walls 58 of the support member 16. When the nut 65c is tightened, the washer 65b' captures and pushes together the side walls 58, further strengthening their capture of the head of the bolt 65a. Thus, as the tightening force on the nut 65c is increased, the capturing force of the side walls 58 on the bolt 65a is increased, inhibiting the bolt 65a from rotating as a result of the increased tightening force.

It will be noted that the washer 65b' may have any suitable shape for pushing the side walls 58 together. For example, the washer 65b' may alternatively have an inverted V-shape in side view instead of an arcuate shape. Furthermore, the washer 65b' may have any shape in plan view. For example, the washer 65b' may have a generally circular shape or may alternatively have a rectangular shape so that it better captures the side walls 58.

Figure 6A:
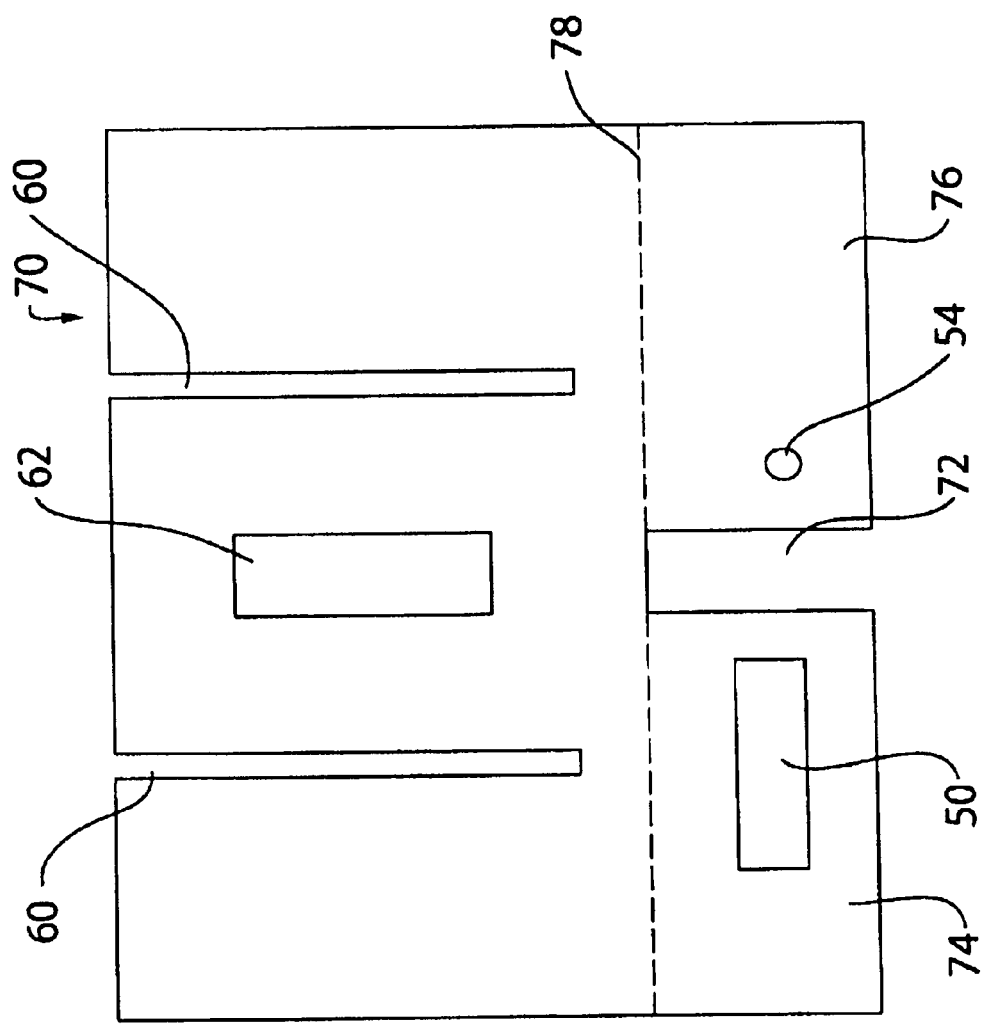
FIG. 6a is a magnified plan view of the support member shown in FIG. 1, in a partial state of manufacture.
Figure 6B:
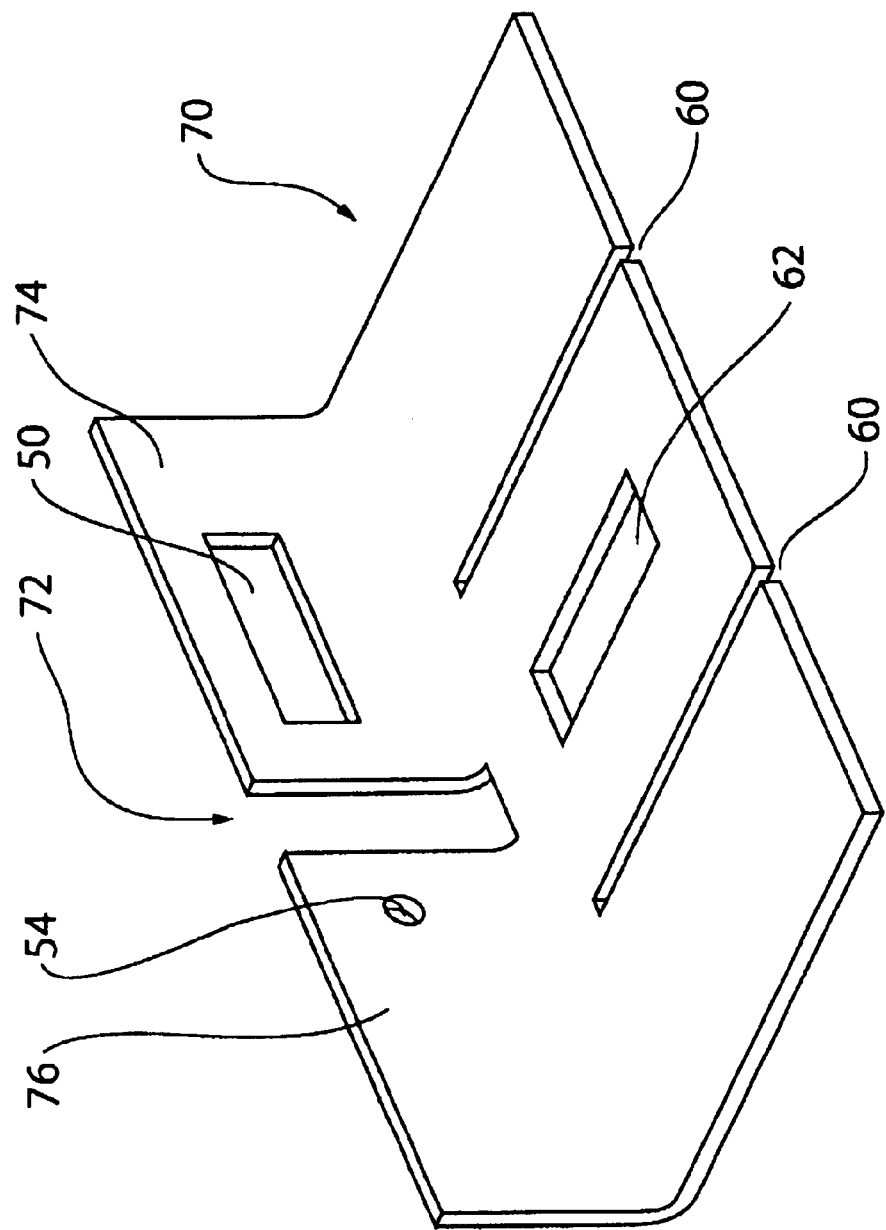
FIG. 6b is a perspective view of the support member shown in FIG. 6a in a further state of manufacture.

Reference is made to FIG. 6a, which shows a plate 70 which may be used to manufacture the support member 16 (FIG. 1). The plate 70 may be machined with a plurality of apertures and slots which will ultimately form the slot 60, the aperture 62 and the mounting apertures 50 and 54. Furthermore, a slot 72 may be machined into the plates 70, to remove unnecessary material. Once the plate 70 is machined with the appropriate slots and apertures, it may be bent into the shape of the support member 16 by two primary bending operations. The first bending operation bends the two tabs shown at 74 and 76 along a bend line 78, resulting in the structure 79 shown in FIG. 6b. The tabs 74 and 76 will ultimately form the mounting flange 42 (FIG. 4). The second bending operation involves folding the plate 70 generally about a fold line 80. The folding of the plate 70 may be performed on a radiused surface thereby forming the upper portion 59 and the spaced apart side walls 58. Manufacturing the support member 16 in this way saves cost and manufacturing time while providing a relatively strong resulting structure. It will be noted that the order of operations described is preferable, but may alternatively be rearranged in any suitable way.

By making the support member 16 by appropriately machining and by applying two simple bends to the single, integral plate 70, the cost of manufacture for the support member 16 are reduced, relative to complex structures of the prior art which are made from multiple pieces which are welded together.

Reference is made to FIG. 1, which shows the connector 10 in use. In use, a plurality of connectors 10 are used to support a plurality of panels of veneer 14 in a spaced relationship from the back up wall 18 of a structure such as an office tower. The support members 16 are mounted to the back-up wall, and may be spaced from each other in a generally horizontally and vertically extending array. The veneer connectors 12 are positioned in the slots 60 (FIG. 5), and extend therefrom to support the veneer panels 14. The fastening ties 36 (FIG. 3) extend between vertically adjacent veneer panels 14 and pass through the veneer connection apertures 34, which retain the panels 14 in place. Furthermore, mortar may be used to close any air gap adjacent veneer panels 14, and to assist in retaining the panels 14 in place. The vertical load F that results from the weight of the veneer panels 14 is supported by the veneer connectors 12, and in turn, by the support members 16. Because the support members 16 have generally high moments of inertia in the vertical direction, they are able to be made with relatively thin gauge material for supporting the load imposed thereon by the veneer panels 14. It will be noted that while two connectors 10 are shown along the top edge of each veneer panel 14, any suitable number of connectors 10 may be used to support each veneer panel 14, depending on the nature of the specific application.

Figure 7:
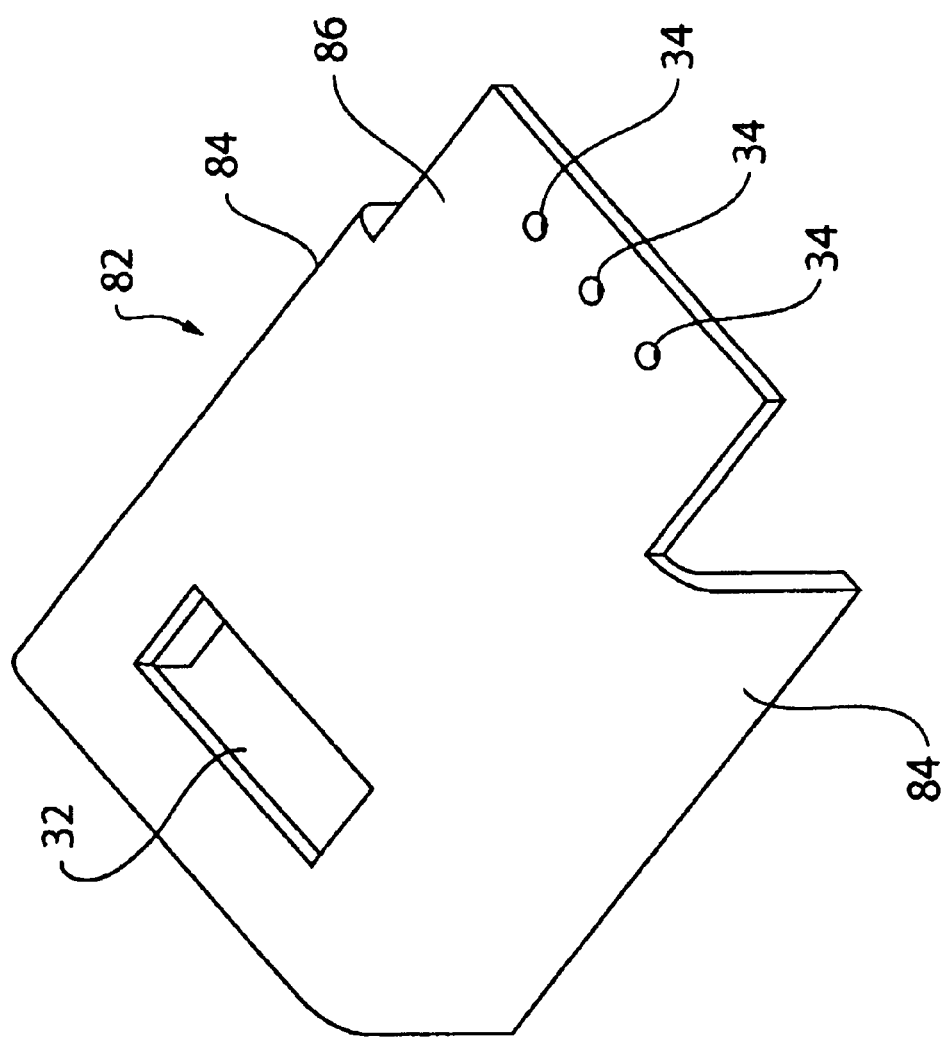
FIG. 7 is a magnified perspective view of an alternative veneer connector to that which is shown in FIG. 1.

Reference is made to FIG. 7, which shows a veneer connector 82, which may be used alternatively to the veneer connector 12. The veneer connector 82 may be similar to the veneer connector 12 (FIG. 2), or the veneer connector 12' (FIG. 2a), except that the veneer connector 82 has a pair of side webs 84 that extend vertically from the side edges of the veneer connector 82. The side webs 84 may extend generally along substantially the entire length of the veneer connector 82, except for the portion 86 of the veneer connector 82 that will be embedded within the gap between adjacent veneer panels 14 (FIG. 1). The side webs 84 provide increased bending resistance to the veneer connector 82, relative to the veneer connector 12 (FIG. 2), because the side webs 84 generally increase the moment of inertia of the veneer connector 82.

Figure 8:
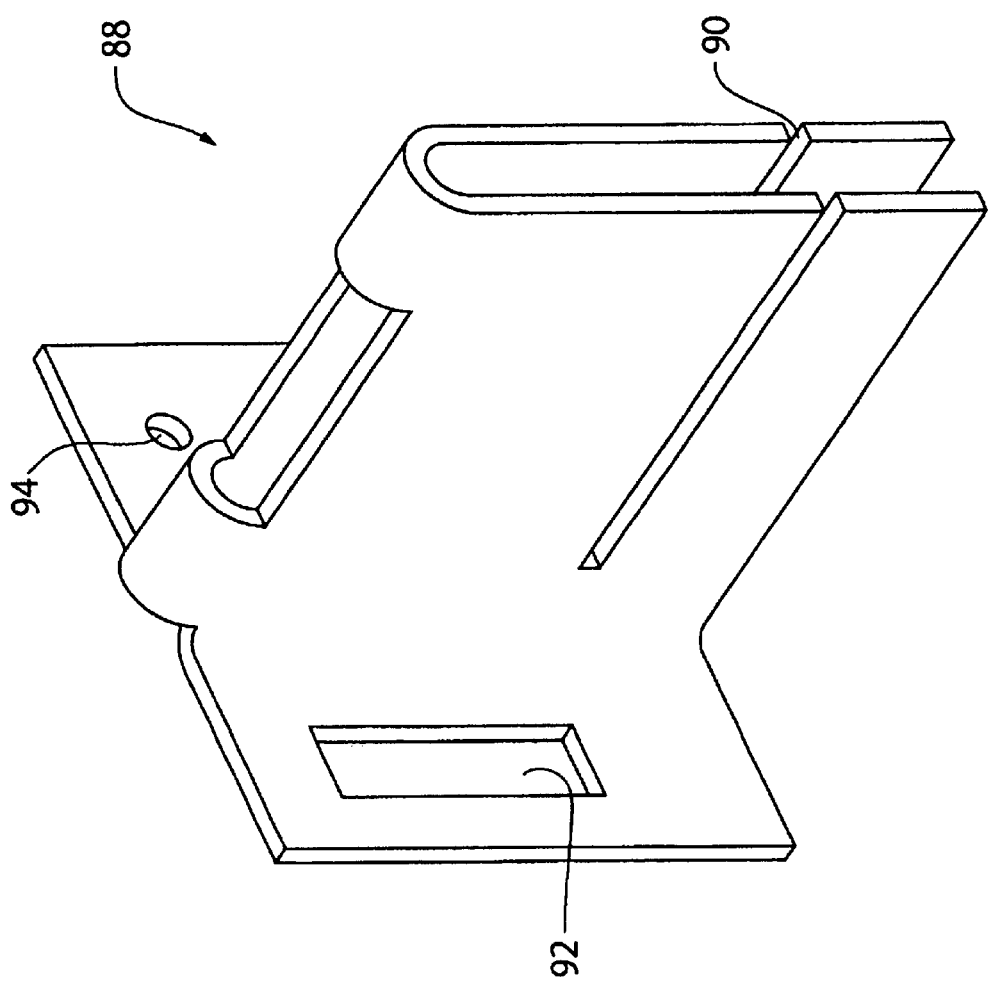
FIG. 8 is a perspective view of a variant of the support member shown in FIG. 4.

Reference is made to FIG. 8, which shows a support member 88 that maybe used as an alternative to the support member 16 (FIG. 4). The support member 88 may be similar to the support member 16, except that the support member 88 has a slot 90 that positioned closer to the bottom of the support member 88, relative to the slot 60 on the support member 16 (FIG. 4). The slot 90 may otherwise be similar to the slot 60, and is for receiving and retaining the veneer connector 12 or 82 (FIGS. 2 and 2a). Referring to FIG. 8a, the slot 90 is positioned sufficiently low, so that, when the support member 88 is being mounted to the back-up wall 18 proximate the top edge of a veneer panel 14, the veneer panel 14 does not completely obstruct access to the adjustment aperture and the securing aperture, which are shown at 92 and 94 respectively. Thus, the relatively lower position of the slot 90 facilitates the mounting of the support member 88.

Figure 10:
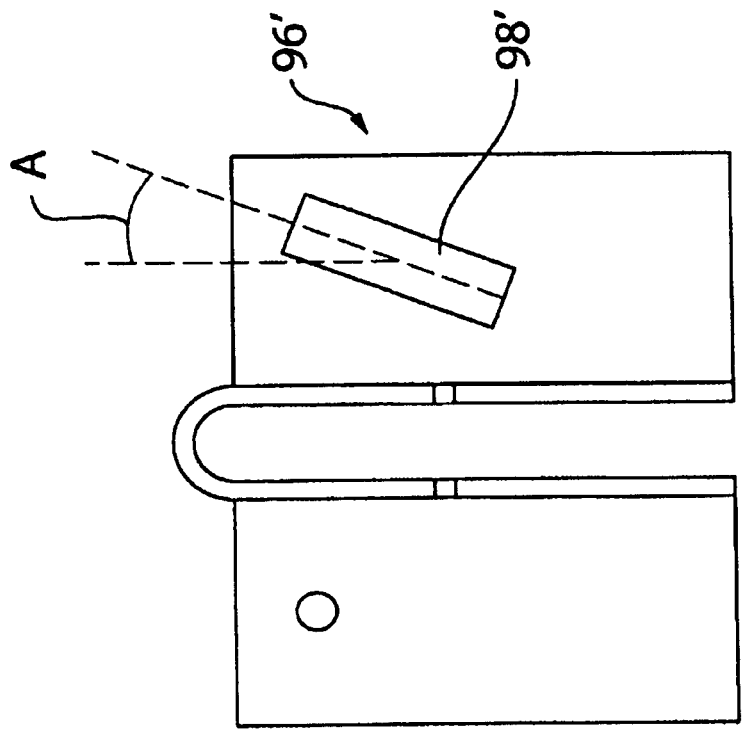
FIG. 10 is a end view of yet another variant of the support member shown in FIG. 4.
Figure 9:
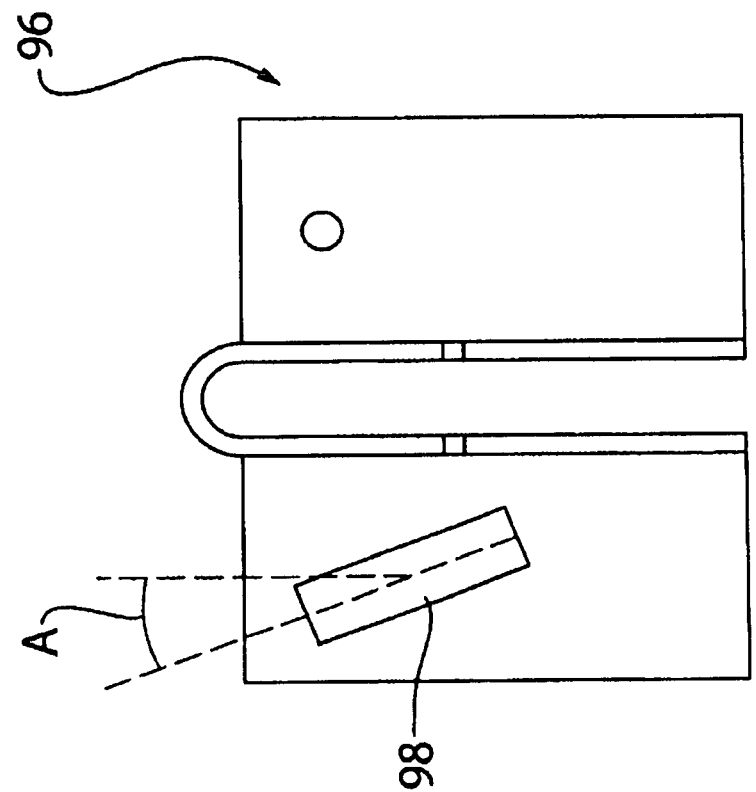
FIG. 9 is a end view of another variant of the support member shown in FIG. 4.

Reference is made to FIG. 9, which shows a support member 96, which is another alternative to the support member 16. The support member 96 may be similar to the support member 16, except that the support member 96 has an adjustment aperture 98 that is elongate along an angle A from the vertical. The adjustment aperture 98 in the embodiment shown in FIG. 9 provides vertical adjustability for the support member 96, in a similar way to the adjustment aperture 50 on the support member 16 (FIG. 4). During vertical adjustment of the support member 96, however, the support member 96 will be shifted by a certain amount horizontally. Preferably, the angle A from the vertical is small, to reduce the horizontal shift that occurs during vertical adjustment of the support member 96. Referring to FIG. 10, a support member 96' may also be made which has an adjustment aperture 98' that is a mirror image of the adjustment aperture 98 (FIG. 9).

Figure 11:
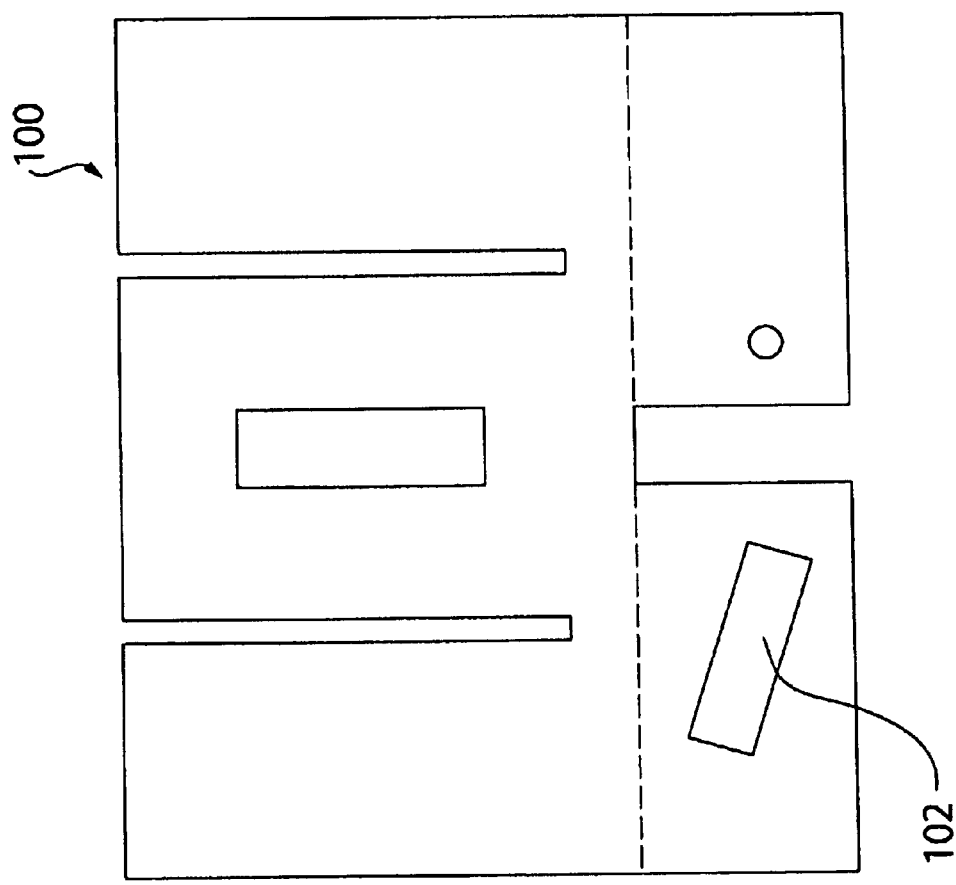
FIG. 11 is a plan view of a work piece that is in a partial state of manufacture, which can be made into either of the support members shown in FIGS. 9 and 10.
Figure 12A:
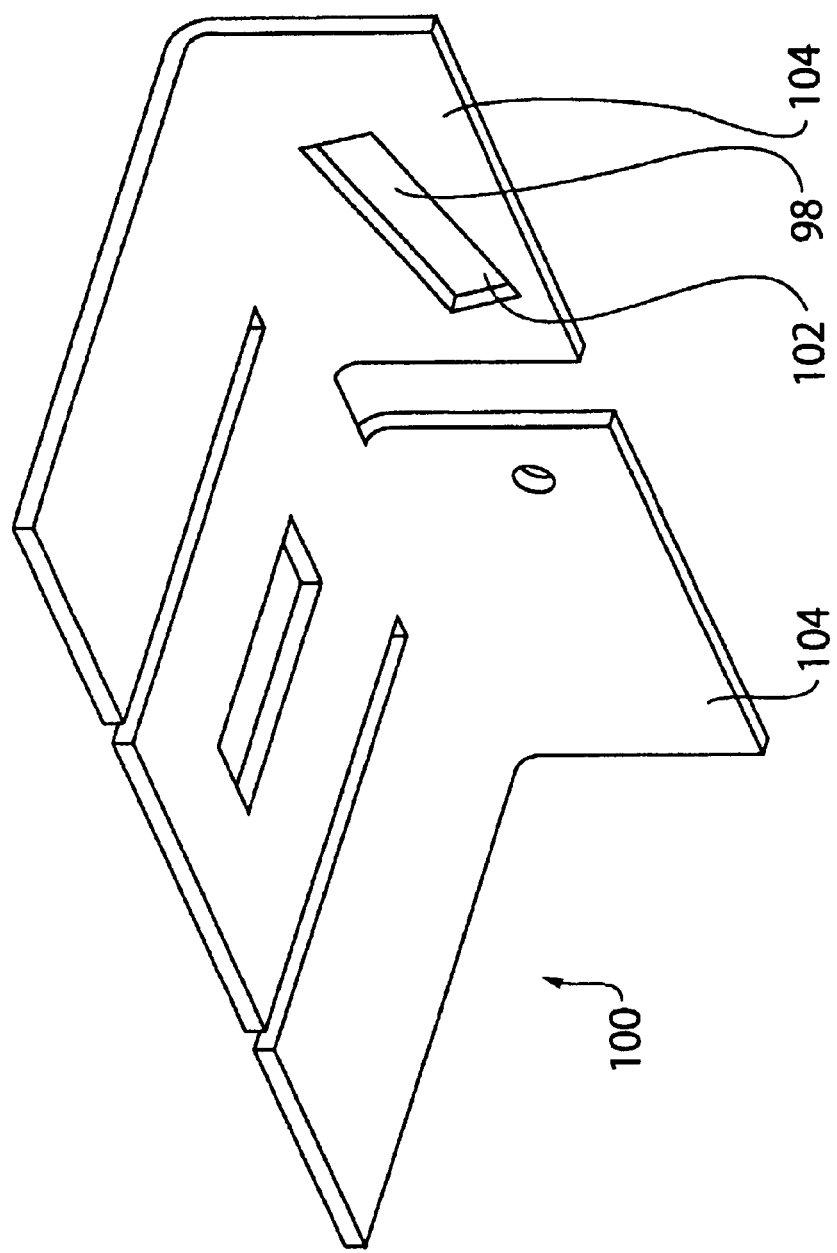
FIGS. 12a and 12b are perspective views of the work piece shown in FIG. 11, in a further state of manufacture.
Figure 12B:
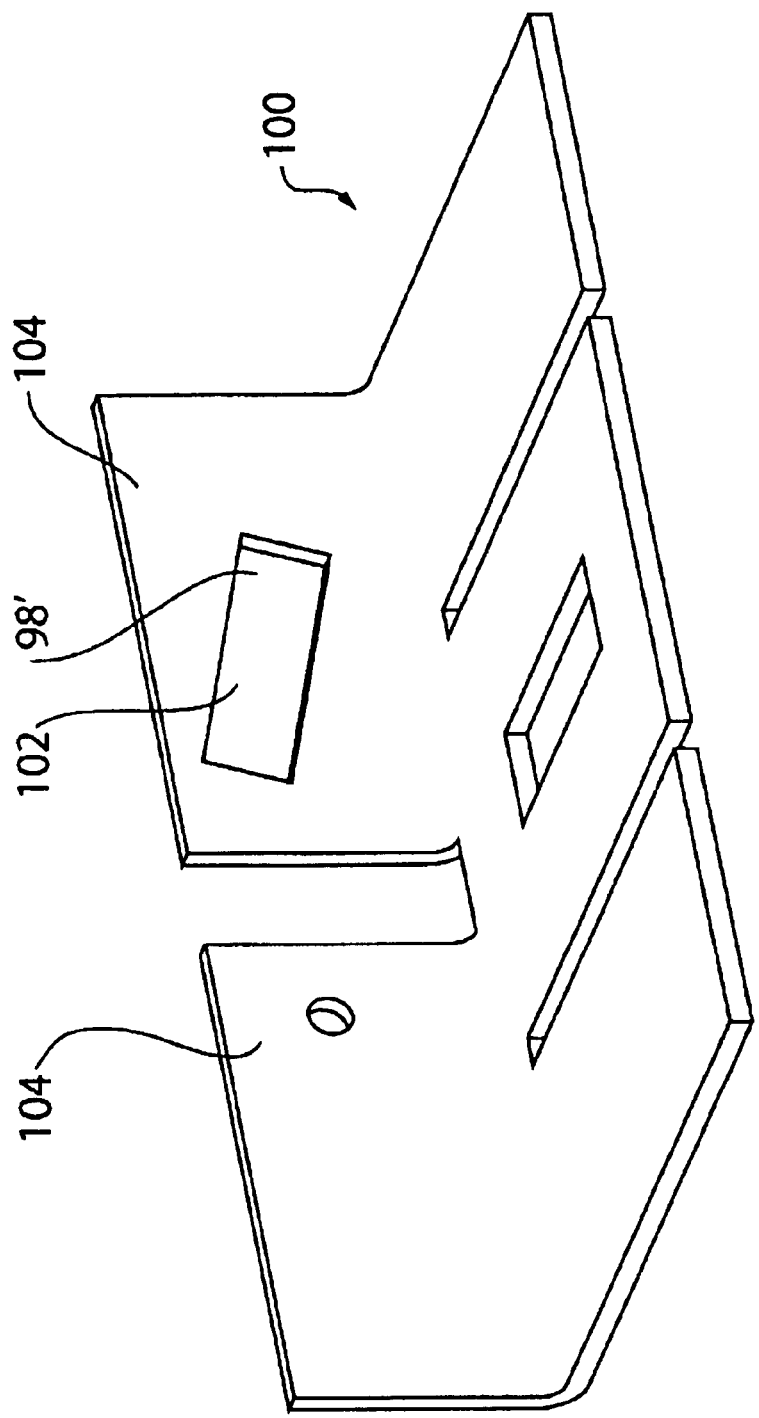

Referring to FIG. 11, the support members 96 and 96' may be manufactured from a common plate 100. The common plate 100 may be similar to the plate 70 (FIG. 6a), except that the common plate 100 has an aperture 102 therein, that will ultimately become the adjustment aperture 98 (FIG. 9), or the adjustment aperture 98' (FIG. 10), depending on which way the plate 100 is folded during manufacture. For example, referring to FIG. 12a, the tabs on the plate 100, which are shown at 104 may be folded in a first direction, so that the plate 100 will ultimately form the support member 96. However, referring to FIG. 12b, the tabs 104 may be folded in a second direction that is opposite the first direction, so that the plate 100 ultimately forms the support member 96'.

Figure 13:
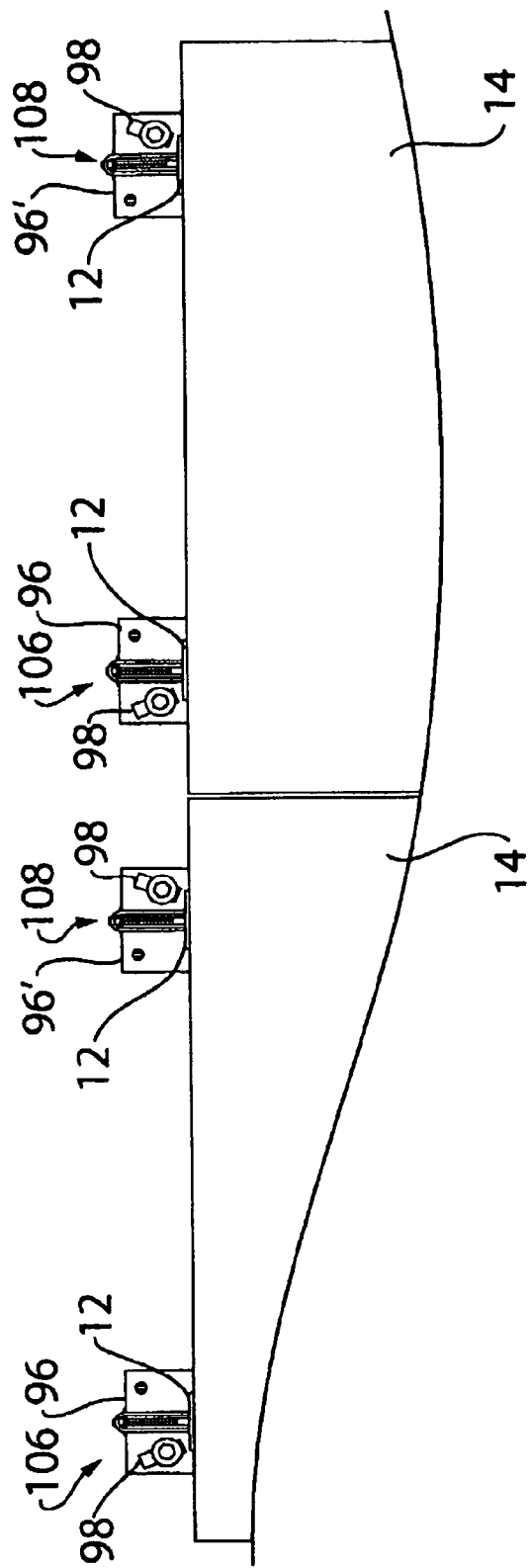
FIG. 13 is a plan view of a system, made up of the connectors shown in FIGS. 9 and 10, supporting veneer panels to a back-up wall.

Reference is made to FIG. 13, which shows a system of connectors 106 and 108, which cooperate in pairs to support veneer panels 14. The connectors 106 and 108 may be similar to the connector 10 (FIG. 1), and include a suitable veneer connector, such as the veneer connector 12. However, the connectors 106 and 108 include the support members 96 and 96' respectively, instead of the support member 16 (FIG. 1).

The top and bottom edges of the panel 14 are supported by at least one of each connector 106 and 108. As a result, the weight of the panel 14 is prevented from dragging the connectors 106 and 108 down the wall 18, because the adjustment apertures extend in different directions. Thus, because the adjustment apertures 98 and 98' are not parallel to each other when the connectors 106 and 108 are installed on the back-up wall and are in use, the adjustment apertures 98 and 98' cooperate with their respective fasteners and with each other to prevent the connectors 106 and 108 from being dragged down from their supported load.

It will be noted that more than one of each connector 106 and 108 may be used to support an edge of the veneer panel 14. For example, several of one type of connector, eg. connector 106 and one or two of the other type of connector, eg. connector 108, may be used to support an edge of the veneer panel 14. At least one of each connector 106 and 108 is used, however.

It will be noted that the features shown in the support members 16, 88, 96 and 96' may all be combined into a support member in accordance with the present invention in any desired way. For example, a support member may be provided that includes the basic structure of support member 16, but that has a low-positioned slot, similar to the slot 90 of support member 88 (FIG. 8), and that also has a slanted adjustment aperture, similar to the adjustment aperture 98 or 98' of support members 96 and 96' (FIGS. 9 and 10).

In the embodiments described above, the side walls of the support members are integrally connected to the mounting flanges along a vertical line. It will be noted that the line along which the side walls connect to the mounting flanges need not be strictly vertical, but are at least generally vertical.

In the embodiments described above, the side walls of the support members have been described and shown as extending outwardly from the mounting flanges along vertical planes. It will be noted that the vertical planes need not be strictly vertical, but are at least generally vertical. In another alternative, the side walls of the support members need not be strictly planar, and may instead be curved or may have further folds, which are preferably generally vertical.

In the embodiments described above, the veneer connector mounts to the support member using a single fastener, such as a bolt. Using a single fastener instead of a plurality of fasteners can provide a significant cost savings in the overall cost of the connector, particularly in jurisdictions which require the use of stainless steel for connectors supporting veneer panels in a cavity wall.

The connectors of the present invention are able to support the same loads as the L-shaped connectors of the prior art, but can be manufactured from thinner material, with fewer fasteners. As a result the connectors of the present invention can be less expensive than the L-shaped connectors of the prior art.

While what has been shown and described herein constitutes the preferred embodiments of the subject invention, it will be understood that various modifications and adaptations of such embodiments can be made without departing from the present invention, the scope of which is defined in the appended claims.

What is claimed is:

1. A connector for coupling a veneer panel to a back-up wall, the connector comprising:
    a veneer connector, wherein said veneer connector is adapted to support a generally horizontal edge of said veneer panel; and
    a support member, said support member including a generally inverted-U-shaped portion and a mounting flange, wherein the mounting flange is adapted for securing said support member to said back-up wall, said inverted-U-shaped portion including a first support member side wall and a second support member side wall, wherein said first and second support member side walls are generally vertical and spaced apart from each other and are configured for supporting said veneer connector, and wherein each of said first and second support member side walls is supported by said mounting flange arranged orthogonally along a generally vertical line,
    wherein said veneer connector is configured to connect to said veneer panel.

2. A connector as claimed in claim 1, wherein said veneer connector is configured to support said veneer panel along a load transfer region, and wherein said first and second support member side walls are configured to support said veneer connector proximate said load transfer region.

3. A connector as claimed in claim 1, wherein said support member is free of welds.

4. A connector as claimed in claim 1, wherein said support member is made from a single integral piece of material and is free of welds.

5. A connector as claimed in claim 1, wherein said veneer connector has at least one veneer connector side wall, wherein said at least one veneer connector side wall is generally vertical and extends along a portion of said veneer connector that is unsupported by said support member.

6. A connector as claimed in claim 1, wherein said veneer connector is connected to said support member by a single fastener.

7. A connector as claimed in claim 1, wherein a generally horizontal slot is defined in each of said first and second support member side walls for receiving said veneer connector.

8. A connector as claimed in claim 7, wherein said mounting flange has a plurality of apertures therethrough for mounting said support member to said back-up wall, and wherein said plurality of apertures are positioned above said generally horizontal slot.

9. A connector as claimed in claim 1, wherein said inverted-U-shaped portion has a top portion, wherein a first fastener aperture is defined through the top portion, wherein a second fastener aperture is defined in the veneer connector, and wherein said fastener passes through the first and second apertures.

10. A connector as claimed in claim 9, wherein at least one of said first and second fastener apertures is elongate in a first direction, wherein said first direction is generally horizontal.

11. A connector as claimed in claim 10, wherein the other of said first and second fastener apertures is elongate in a second direction that is generally orthogonal to said first direction, and wherein said second direction is generally horizontal.

12. A connector system for coupling at least one veneer panel to a back-up wall, the connector system comprising:

a plurality of connectors, wherein each connector includes a veneer connector and a support member, wherein said veneer connector is adapted to support a generally horizontal edge of said veneer panel, and wherein said support member includes a generally inverted-U-shaped portion and a mounting flange, wherein said mounting flange is adapted for securing said support member to said back-up wall, said inverted-U-shaped portion including a first support member side wall and a second support member side wall, wherein said first and second support member side walls are generally vertical and spaced apart from each other and are configured for supporting said veneer connector, and wherein each of said first and second support member side walls is supported by said mounting flange arranged orthogonally along a generally vertical line, and wherein each veneer panel is retained by at least one of said connectors from above and at least one of said connectors from below.

13. A connector system as claimed in claim 12, wherein said mounting flange has an adjustment aperture therethrough, wherein the adjustment aperture is elongate and is adapted to adjustably receive a fastener therethrough for mounting said support member to said back-up wall.

14. A connector system as claimed in claim 13, wherein said adjustment aperture is generally vertical.

15. A connector system for coupling at least one veneer panel to a back-up wall, the connector system comprising:

a plurality of connectors, wherein each connector includes a veneer connector and a support member, wherein said veneer connector is adapted to support a generally horizontal edge of said veneer panel, and wherein said support member includes a mounting flange, wherein said mounting flange is adapted for securing said support member to said back-up wall, said support member further including at least one support member side wall for supporting said veneer connector, wherein said at least one support member side wall extends from said mounting flange in a generally vertical plane, and wherein each veneer panel is retained by at least one of said connectors from above and at least one of said connectors from below, and wherein said mounting flange has an adjustment aperture therethrough, wherein the adjustment aperture is elongate and is adapted to adjustably receive a fastener therethrough for mounting said support member to said back-up wall, and wherein said plurality of connectors includes a plurality of first connectors and a plurality of second connectors, wherein on said first connectors said adjustment aperture extends in a first direction, and on said second connectors said adjustment aperture extends in a second direction, wherein the second direction is not parallel with said first direction.

16. A connector for coupling a veneer panel to a back-up wall, the connector comprising:

a veneer connector, wherein said veneer connector is adapted to support a generally horizontal edge of said veneer panel; and a support member, said support member including a first support member side wall and a second support member side wall, wherein said first and second support member side walls are generally vertical and spaced apart from each other and wherein a side wall connecting portion connects said first and second side walls to each other, and wherein said first and second side walls are configured for supporting said veneer connector, and wherein each of said first and second support member side walls is supoorted by said mounting flange arranged orthogonally along a generally vertical line, wherein said veneer connector is configured to support said veneer panel.

17. A connector as claimed in claim 16, wherein said side walls each have a top and wherein said side wall connecting portion connects said side walls at the tops.

* * * * *